United States Patent [19]

White et al.

[11] Patent Number: 4,480,378

[45] Date of Patent: Nov. 6, 1984

[54] METHOD OF ASSEMBLING A DYNAMOELECTRIC MACHINE AND METHOD OF SECURING A SET OF BEAMS OF A STATIONARY ASSEMBLY FOR A DYNAMOELECTRIC MACHINE TO OPPOSITE END FRAMES THEREFOR

[75] Inventors: Robert W. White; Frank R. Kuzan, both of DeKalb, Ill.

[73] Assignee: General Electric Company, Fort Wayne, Ind.

[21] Appl. No.: 402,282

[22] Filed: Jul. 27, 1982

[51] Int. Cl.³ .................... H02K 15/14; H02K 15/16
[52] U.S. Cl. ........................................ 29/596; 29/732; 228/165; 228/185; 310/42
[58] Field of Search .................... 29/596, 732; 310/42, 310/43, 258; 228/165, 185

[56] References Cited

U.S. PATENT DOCUMENTS 3,164,422  1/1965  Shaffer et al. ................. 308/132
3,857,170 12/1974  Stoner ............................. 29/596
3,961,416  6/1976  Otto ................................ 29/596

Primary Examiner—Carl E. Hall
Attorney, Agent, or Firm—Joseph E. Papin

[57] ABSTRACT

A method of securing a set of beams of a stationary assembly for a dynamoelectric machine to a pair of opposite end frames thereof. The beams have a pair of opposite ends with a pair of oppositely extending tabs thereon, and the end frames have a pair of sets of aperture extending therethrough with sidewalls of the apertures being sized predeterminately greater than the tabs, respectively. In this method, the tabs on the opposite ends of the beams are located at least in part within the apertures in the opposite end frames, and the tabs are spaced from the sidewalls of the apertures, respectively. At least a part of the opposite end frames at least adjacent the aperture therein, are welded generally simultaneously to at least a part of each tab located in respective ones of the apertures, respectively.

A method of assembling a dynamoelectric machine is also disclosed.

40 Claims, 14 Drawing Figures

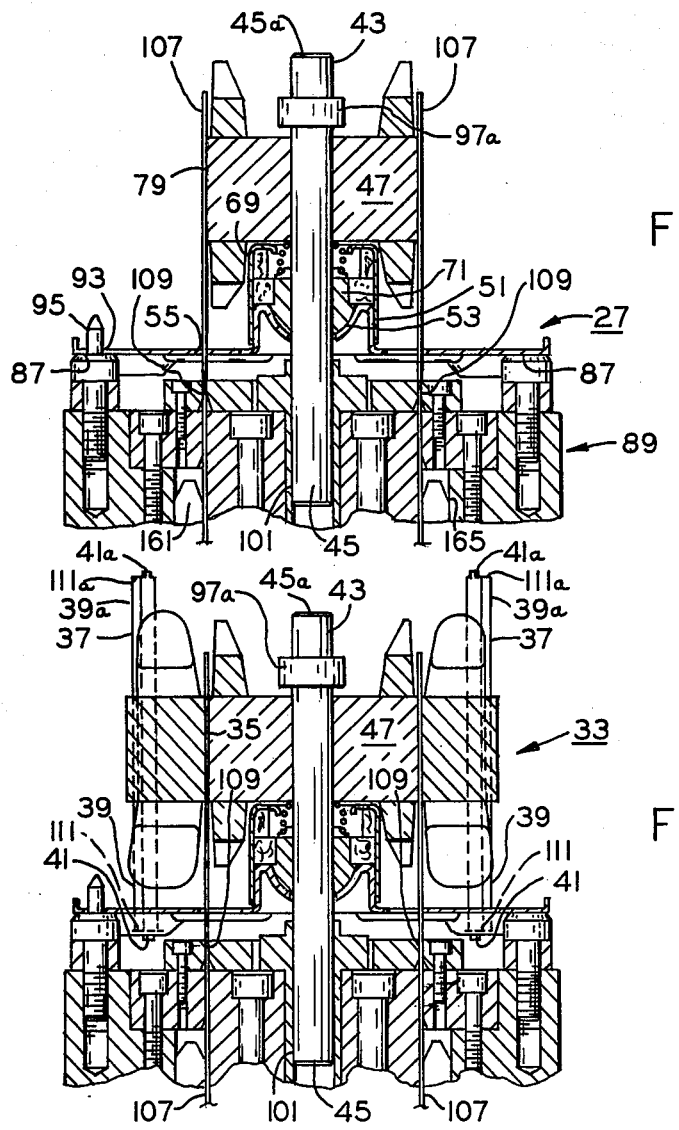
FIG. 5
FIG. 6
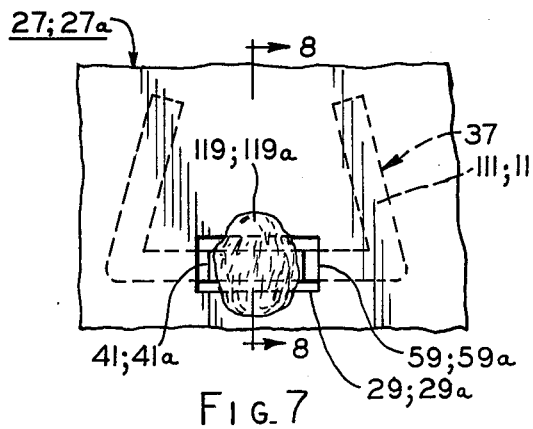
FIG. 7
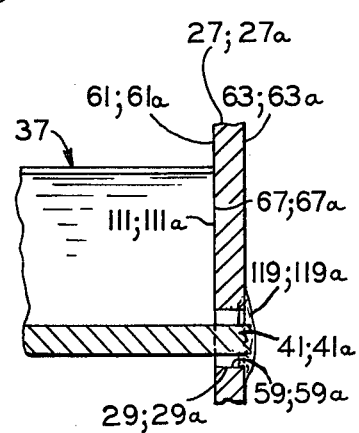
FIG. 8

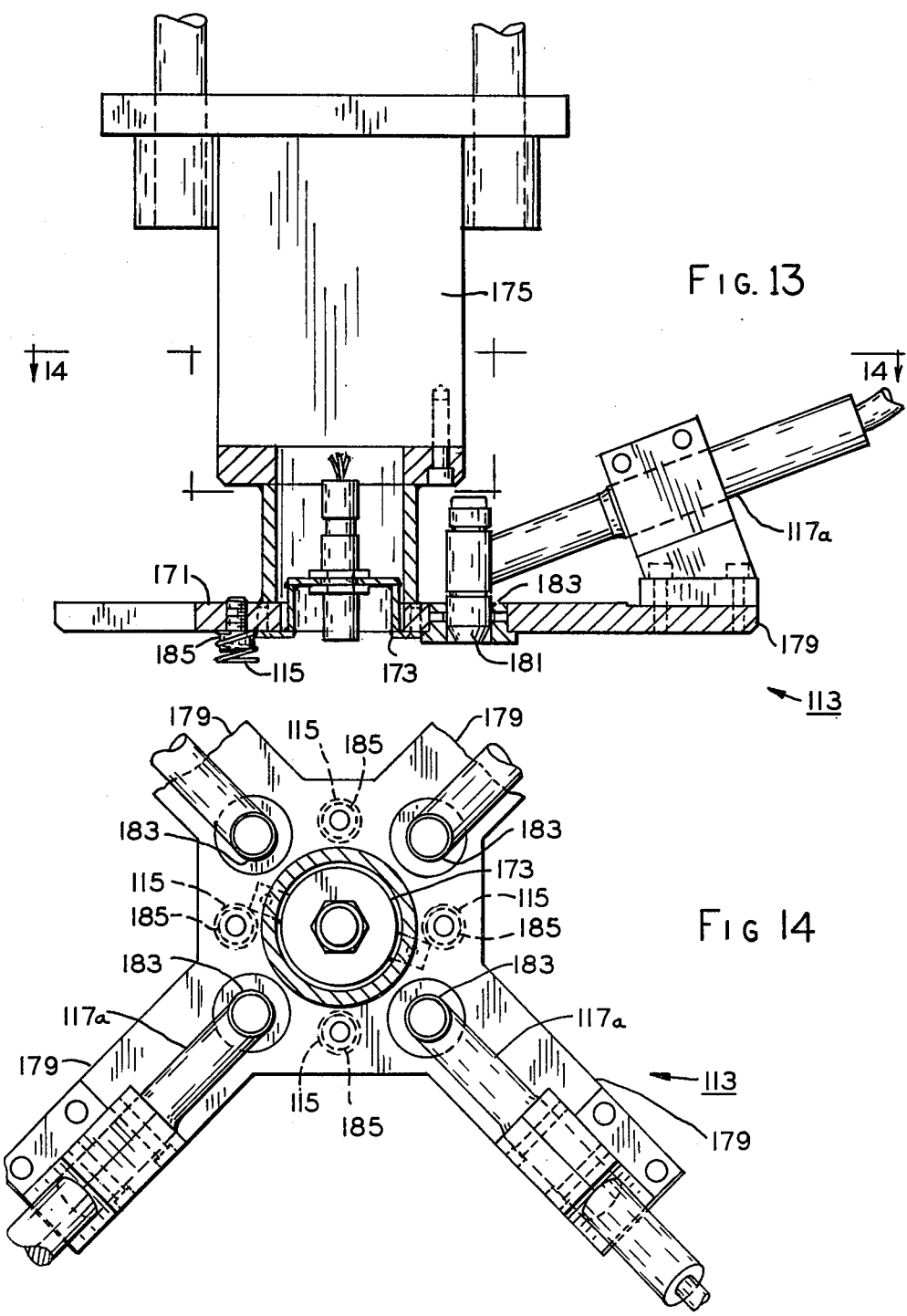

METHOD OF ASSEMBLING A DYNAMOELECTRIC MACHINE AND METHOD OF SECURING A SET OF BEAMS OF A STATIONARY ASSEMBLY FOR A DYNAMOELECTRIC MACHINE TO OPPOSITE END FRAMES THEREFOR

CROSS-REFERENCE TO RELATED APPLICATIONS

This application is related to the commonly assigned application of Robert W. White Ser. No. 402,320 filed July 27, 1982 concurrently herewith entitled "Dynamoelectric Machine" and also to the commonly assigned Charles W. Otto application Ser. No. 377,554 filed May 12, 1982 entitled "Dynamoelectric Machine and Methods", and each of these aforementioned applications is incorporated herein by reference.

FIELD OF THE INVENTION

This invention relates in general to dynamoelectric machines and in particular to improved methods for assembling a dynamoelectric machine.

BACKGROUND OF THE INVENTION

In the past, various and sundry methods and apparatus have been employed in the assembly of dynamoelectric machines For instance, U.S. Pat. No. 3,857,170 issued Dec. 31, 1974 to Jesse A. Stoner illustrates a method and apparatus for positioning components for the assembly together of such components. In this method and apparatus, a pair of opposite end frames, a rotor and a stator were aligned with respect to each other so as to compensate for any out-of-square opposite end faces of the stator, and a hardenable material was introduced between opposite end portions of a set of beams carried by the stator and the end frames so as to interconnect the dynamoelectric machine components in their aligned and assembled relation.

In another prior art method and apparatus for assembling the dynamoelectric machine illustrated in U.S. Pat. No. 3,164,422 issued Jan. 5, 1965 to P. B. Shaffer et al, one opposite end shield of such dynamoelectric machine had a generally central bearing assembly associated therewith and was located in a preselected position on a seat provided on an assembly fixture of the assembly apparatus. When so located on the assembly fixture seat, four spaced apart generally peripheral welding flanges integrally formed with the one opposite end shield extended generally vertically upwardly therefrom. A rotor and shaft assembly included a pair of opposite oil slinger-thrust members secured to opposite ends of the shaft, respectively, and one end of the shaft was inserted through the bearing assembly of the one opposite end shield until the oil slinger-thrust member on such shaft end was seated in engagement with the bearing assembly of the one opposite end shield. A locating recess associated with the assembly fixture of the apparatus was provided to receive the one shaft end of the rotor and shaft assembly generally as it was inserted through the bearing assembly of the one opposite end shield. With the one shaft end so received in the locating recess of the apparatus, the rotor and shaft assembly was located in a preselected position extending generally perpendicularly with respect to the seat of the assembly fixture on which the one opposite end shield was located. After the rotor and shaft assembly and the one opposite end shield were so located in the preselected positions thereof with respect to each other, a shim set of the apparatus was extended through ventilation openings provided therefor in the one opposite end shield into positions about the periphery of the rotor. At this time, a bore of a stator for the dynamoelectric machine was also positioned about the rotor with the shim set in shimming engagement therebetween so as to provide a generally uniform air gap between the periphery of the rotor and the stator bore. As the stator was lowered into position about the rotor, the lower end face was engaged with a plurality of locating pins therefor predeterminately located on the apparatus with respect to the seat on the assembly fixture thereof, and in this manner, the lower end face of the stator was predeterminately located or vertically spaced from the one opposite end shield located on such seat. At the same time, four peripheral welding surfaces of the stator were arranged within the four welding flanges of the one opposite end shield at least closely adjacent thereto. With the stator for the dynamoelectric machine so located on the locating pins of the apparatus and also with respect to the rotor and the one opposite end shield, the bearing assembly of the other of the opposite end shield was passed about the other opposite end of the shaft and into seating engagement with the other of the oil slinger-thrust member secured to the other shaft end. Like the one opposite end shield, the other opposite end shield was also provided with four spaced apart, generally peripheral welding flanges integrally formed therewith and extending generally vertically therefrom. As the bearing assembly of the other opposite end shield was passed about the other shaft end, the four welding flanges on the other opposite end shield were arranged about the four welding surfaces of the stator at least closely adjacent thereto and generally in axially aligned and spaced apart relation with the four welding flanges of the one opposite end shield. Another or opposite upper assembly fixture of the apparatus was gripped in engagement with the other opposite end shield, and the upper assembly fixture was actuated to apply a force to insure the engagements of the bearing assemblies in the opposite end shields with the opposite oil slinger-thrust members on the opposite ends of the shaft, respectively, thus ensuring that no end play existed between the rotor and shaft assembly and the opposite end shields. Thereafter, the upper assembly fixture of the apparatus was actuated to raise the other opposite end shield a preselected distance, generally between about 0.040" and about 0.050", which concurrently raised or spaced the bearing assembly on the other opposite end shield from its engagement with the oil slinger-thrust member on the other shaft end thereby to insert a preselected amount of end play into the dynamoelectric machine between the rotor and shaft assembly and the opposite end shields thereof. With the upper assembly fixture of the apparatus maintaining the other opposite end shield in its raised position to insure the maintenance of the preselected end play for the dynamoelectric machine, four welding units of the apparatus were then moved into a position for concurrently welding the four welding flanges of the one opposite end shield to the four peripheral welding surfaces of the stator associated therewith. After effecting these welds, the four welding units of the apparatus were subsequently moved into another position for concurrently welding the four welding flanges of the other opposite end shield to the four peripheral welding surfaces of the stator also associated therewith. Subsequent to the welding of the opposite end shields to the stator to effect the final assembly of the dynamoelectric machine in the assembly apparatus, the dynamoelectric machine in its assembled state was removed therefrom.

SUMMARY OF THE INVENTION

Among the several objects of the present invention may be noted the provision of an improved method of assembling a dynamoelectric machine, and an improved method of securing a set of beams of a stationary assembly of a dynamoelectric machine to a pair of opposite end frames thereof; the provision of such improved methods which obviate the introduction into the dynamoelectric machine of radial stresses sufficient to produce a non-uniform air gap between a bore of a stator of the stationary assembly and a rotor of a rotatable assembly of the dynamoelectric machine; the provision of such improved methods in which a plurality of welds interconnecting the beams and the opposite end frames of the stationary assembly for the dynamoelectric machine are predeterminately spaced from the stator thereof; the provision of such improved methods in which the welding of the opposite end frames to the beams of the stationary assembly occur generally simultaneously; the provision of such improved methods which insure sufficient self-alignment of a pair of bearing assemblies respectively associated with the opposite end frames of the dynamoelectric machine and journaling a shaft of the rotatable assembly so as to insure the free rotation of the rotatable assembly when the assembly of the components of the dynamoelectric machine is completed; the provision of such improved methods which compensate for warpage of the opposite end frames as well as skew in the bore of the stator. These as well as other objects and advantageous features of the present invention will be in part apparent and in part printed out hereinafter.

In general, a method is provided in one form of the invention for assembling a dynamoelectric machine having a stationary assembly and a rotatable assembly. The stationary assembly includes a pair of opposite end frames with a pair of sets of apertures extending therethrough, respectively, with at least one of the end frames having a generally central opening therethrough, a stator having a bore therethrough, and a set of beams secured to the stator with the beams having a pair of oppositely extending tabs on the opposite ends thereof, respectively. The rotatable assembly includes a shaft having a pair of opposite end portions, and a rotor secured to the shaft between the shaft end portions. In this method, the at least one end frame and the rotatable assembly are located generally in preselected positions with one of the shaft end portions of the rotatable assembly extending through the generally central opening in the at least one end frame, and the stator bore is aligned at least in part about the rotor of the rotable assembly to define an air gap therebetween. The tabs on one of the opposite ends of the beams are received within one of the aperture sets in the at least one end frame, respectively, and the other of the aperture sets in the other of the end frames are disposed generally about the tabs on the other of the end portions of the beams. The end frames are then welded at least generally adjacent the aperture sets therein to at least a part of each tab on the beams arranged within the aperture sets, respectively.

Further in general, a method is provided in one form of the invention for securing a set of beams of a stationary assembly for a dynamoelectric machine to a pair of opposite end frames thereof. The beams have a pair of opposite ends with a pair of oppositely extending tabs thereon, respectively, and the end frames have a pair of sets of apertures extending therethrough, with sidewalls of the apertures being sized predeterminately greater than the tabs, respectively. In this method, the tabs on the opposite ends of the beams are located at least in part within the apertures in the end frames and the tabs are spaced from the sidewalls of the apertures, respectively. At least a part of the end frames are generally simultaneously welded at least adjacent the apertures therein to at least a part of each tab located in respective ones of the apertures, respectively.

BRIEF DESCRIPTION OF THE DRAWINGS

FIGS. 2-6 and 9 are partial sectional views illustrating principles which may be utilized in a method of assembling the dynamoelectric machine of FIG. 1 and also in a method of securing a set of beams of a stationary assembly for the dynamoelectric machine of FIG. 1 to a pair of opposite end frames therefor in one form of the invention, respectively;

FIG. 7 is an enlarged partial elevational view of an end frame of the dynamoelectric machine of FIG. 1 showing an aperture thereof with a tab of one beam on a stator of the dynamoelectric machine received therein;

FIG. 8 is a sectional view taken along line 8—8 in FIG. 7;

FIG. 13 is an enlarged partial side elevational view of an upper assembly fixture of the apparatus of FIG. 10, a section of the upper assembly fixtures being shown in FIG. 9; and FIG. 14 is a top elevational view of the upper assembly fixture of FIG. 13.

Corresponding reference characters indicate corresponding parts throughout several views of the drawings.

The exemplifications set out herein illustrate the preferred embodiments of the present invention in one form thereof, and such exemplifications are not to be construed as limiting in any manner the scope of the invention.

DETAILED DESCRIPTION OF THE PREFERRED EMBODIMENTS

Figure 1:
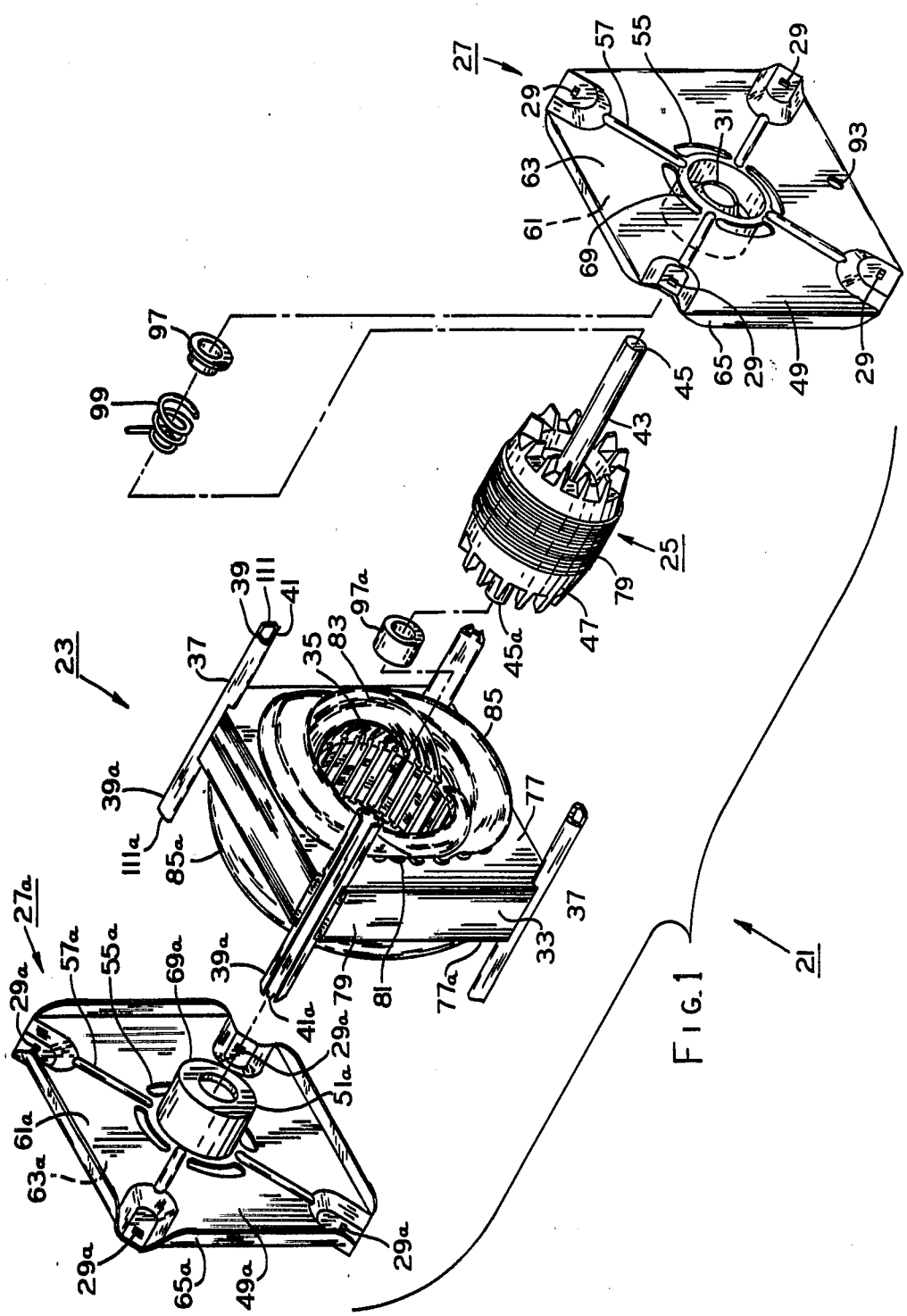
FIG. 1 is an exploded perspective view of a dynamoelectric machine.
Figure 2:
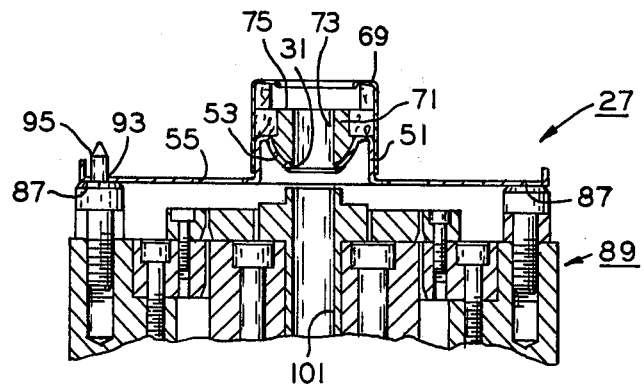
Figure 3:
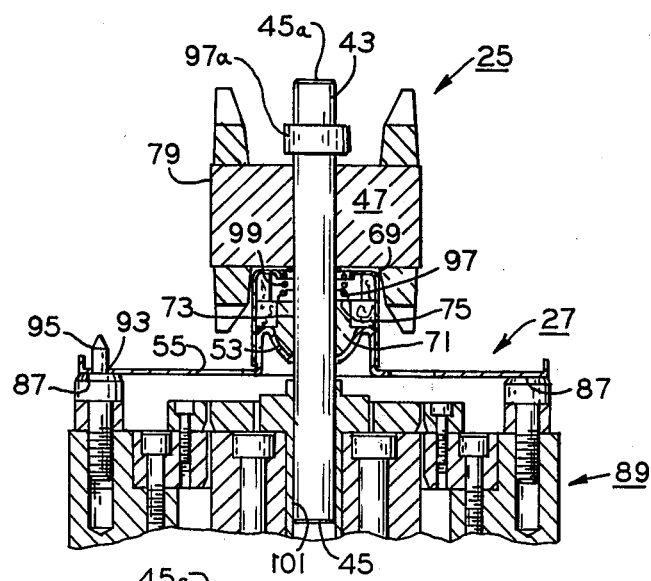

Referring to the drawings in general, there is illustrated in one form of the invention a method of assembling a dynamoelectric machine 21 having a stationary assembly 23 and a rotatable assembly 25 (FIGS. 1-9). Stationary assembly 23 has a pair of opposite end frames 27, 27a with a pair of sets of apertures 29, 29a therethrough, respectively, and with a generally central opening 31 in end frame 27 (FIG. 1). A stator 33 of stationary assembly 23 has a bore 35 therethrough, and a set of beams 37 is secured to the stator. A pair of sets of opposite ends 39, 39a on beams 37 are provided with a pair of sets of oppositely extending tabs 41, 41a, respectively (FIG. 1). Rotatable assembly 25 includes a shaft 43 having a pair of opposite end portions or extensions 45, 45a, and a rotor 47 is secured to the shaft between the end portions thereof (FIG. 1). In this method, end frame 27 and rotatable assembly 25 are located generally in preselected or assembly positions with shaft end portion 45 extending through central opening 31 of the end frame (FIGS. 2 and 3). Stator bore 35 is aligned at least in part about rotor 47 of rotatable assembly 25 to define a desired or predetermined air gap therebetween, and tabs 41 on opposite ends 39 of beams 37 are received within apertures 29 in end frame 27 with the tabs and apertures being predeterminately arranged in spaced apart relation, respectively (FIGS. 5-8). Apertures 29a in end frame 27a are disposed generally about tabs 41a on opposite ends 39a of beams 37 with the tabs and apertures being predeterminately arranged in spaced apart relation, and end frames 27, 27a are conjointly welded at least generally adjacent apertures 29, 29a therein to tabs 41, 41a received within the aperture with the spaced apart relation between the tabs and apertures being maintained, respectively (FIG. 7).

Figure 9:
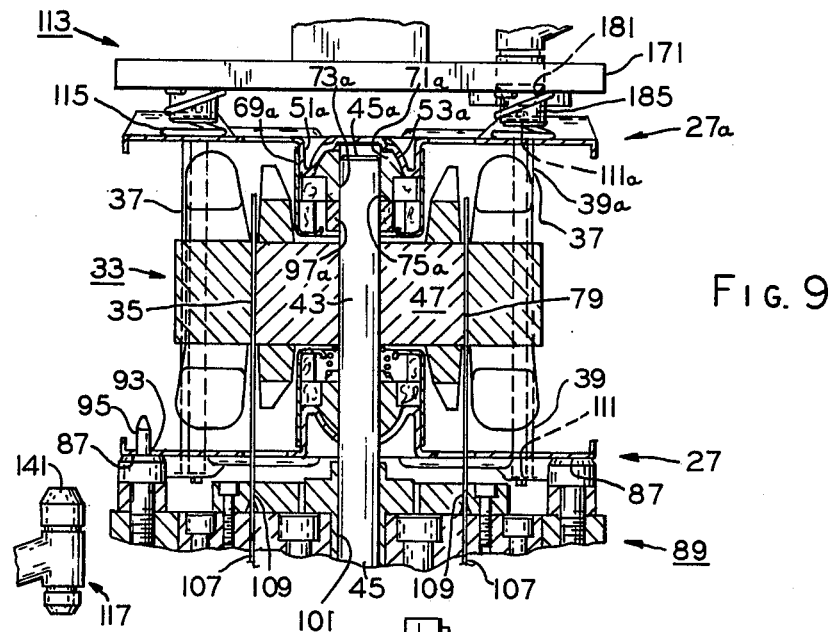

More particularly, and with specific reference to FIG. 1, end frames 27, 27a are lanced or otherwise formed from a metallic sheet material, such as for instance sheet steel or the like, and since the end frames are shown herein as being of generally like constructions, only end frame 27 will be further described with like parts of end frame 27a being designated by the letter "a" for the sake of brevity of disclosure. A generally planar section 49 of end frame 27 extends about a generally central portion thereof which includes a hub or recessed portion 51 having a partial spherical bearing seating surface 53 thereon with central opening 31 extending through the bearing seating surface for receiving shaft 43. A plurality of ventilation openings 55 are provided through planar section 49 of end frame 27 about hub portion 51 thereof, and a plurality of strengthening means, such as ribs 57 or the like for instance, may be provided in the planar section, if desired. Apertures or generally elongate slots 29 each have a sidewall 59 extending between a pair of opposite sides or faces 61, 63 of end frame 27, and the apertures are arranged in preselected locations generally radially outwardly of hub portion 51 and generally adjacent a peripheral marginal edge or circumferential portion 65 of the end frame. A set of beam seating surfaces 67 are provided on opposite face 63 of end frame 27 at least generally adjacent the intersection of aperture sidewalls 59 with end frame face 63. While the constructions and configurations of end frames 27, 27a are described and illustrated herein for purposes of disclosure, it is contemplated that other end frames having different constructions and configurations as well as being formed in different manners and of different materials may be utilized within the scope of the invention so as to meet at least some of the objects thereof. Further, while bearing seating surface 53a of end frame 27a is illustrated as being closed, as seen in FIG. 9, it is contemplated that a shaft receiving opening similar to opening 31 in end frame 27 may be provided in end frame 27a within the scope of the invention so as to meet at least some of the objects thereof.

A pair of lubrication and bearing systems 69, 69a are associated or preassembled with end frames 27, 27a about hub portions 51, 51a thereof so as to form respective units, and such systems include a pair of self-aligning bearings or bearing means 71, 71a having a pair of shaft journaling bores 73, 73a therethrough with a pair of thrust taking surfaces 75, 75a on the bearings extending generally about the bores thereof, respectively. If a more detailed discussion of the construction of lubrication and bearing systems 69, 69a is desired, reference may be had to the aforementioned Charles W. Otto application Ser. No. 377,554 filed May 12, 1982.

Stator 33 has a pair of opposite ends or end faces 77, 77a interconnected by a peripheral surface 79 in which beams 37 are fixedly received. Bore 35 of stator 33 extends generally axially therethrough intersecting with stator end faces 77, 77a, and a plurality of winding means accommodating slots 81 are also provided in the stator intersection with both the stator bore and the stator end faces, respectively. Winding means 83, such as a plurality of conductor turns or coils thereof, is disposed in slots 81 with suitable insulation therebetween, and the winding means has a pair of opposite, generally annular groupings of end turns 85, 85a disposed generally about stator bore 35 adjacent stator end faces 77, 77a, respectively. If a more detailed discussion of the component parts of stationary and rotatable assemblies 23, 25 of dynamoelectric machine 21 is desired, reference may be had to the aforementioned application Ser. No. 402,320 filed concurrently herewith.

In one aspect of the method of assembling dynamoelectric machine 21, end frame 27 is located or oriented in a preselected or assembly position on a supporting means, such as a location seat 87 or the like for instance, provided therefor on a lower assembly fixture 89 of an apparatus 91 for assembling the dynamoelectric machine, as best seen in FIGS. 2 and 10-13. As end frame 27 is placed on location seat 87 in FIG. 2, an orientation or locating opening 93 in the end frame is passed over or received about locating or orientation means, such as for instance a pin 95 or the like, predeterminately arranged on lower assembly fixture 89 with respect to location seat 87 thereof. Thus, with end frame 27 so disposed in its preselected position on location seat 87 and with pin 95 extending through orientation opening 93 in the end frame, the end frame is arranged in its assembly position with respect to lower assembly fixture 89 for subsequent assembly with other components of dynamoelectric machine 21.

A pair of thrust taking devices, such as for instance thrust collars 97, 97a or the like, are assembled about opposite end portions 45, 45a of shaft 43, respectively. A thrust spring 99 is biased between a part or end face of rotor 47 and thrust collar 97 which is slidable on shaft end portion 45, and thrust collar 97a is disposed in a fixed position in gripping engagement about shaft end portion 45a. Of course, the assembly of thrust collars 97, 97a and thrust spring 99 onto shaft 43 may be accomplished either before, after, or generally simultaneously with the above discussed placement of end frame 27 on location seat 87 therefor. Shaft end portion 45 is then passed or inserted through bore 73 in bearing 71 of lubrication and bearing system 69 on end frame 27 and also through central opening 31 thereof, and thrust collar 97 is moved into engagement with thrust taking surface 75 on the bearing, as best seen in FIG. 3. With thrust collar 97 so seated against bearing 71, shaft end portion 45 is moved further through bearing bore 73 and central opening 31 of end frame 27 into guiding and locating engagement with a locating recess, such as for instance a sleeve 101 or the like, provided therefor in lower assembly fixture 89. Of course, in response to this further movement of shaft end portion 45 into locating recess 101, thrust spring 99 is compressed in caged relation between rotor 47 and thrust collar 97 seated against bearing 71. When shaft end portion 45 is so received in locating recess 101, it may be noted that rotatable assembly 25 is located in a preselected or assembly position with respect to end frame 27 on location seat 87, and in this assembly position, the rotational axis of the rotatable assembly is arranged so as to be generally coincidental with an assembly axis A of lower assembly fixture 89, i.e. generally perpendicular to location seat 87 of the lower assembly fixture and to end frame 27 in its located assembly position thereon.

Figure 4:
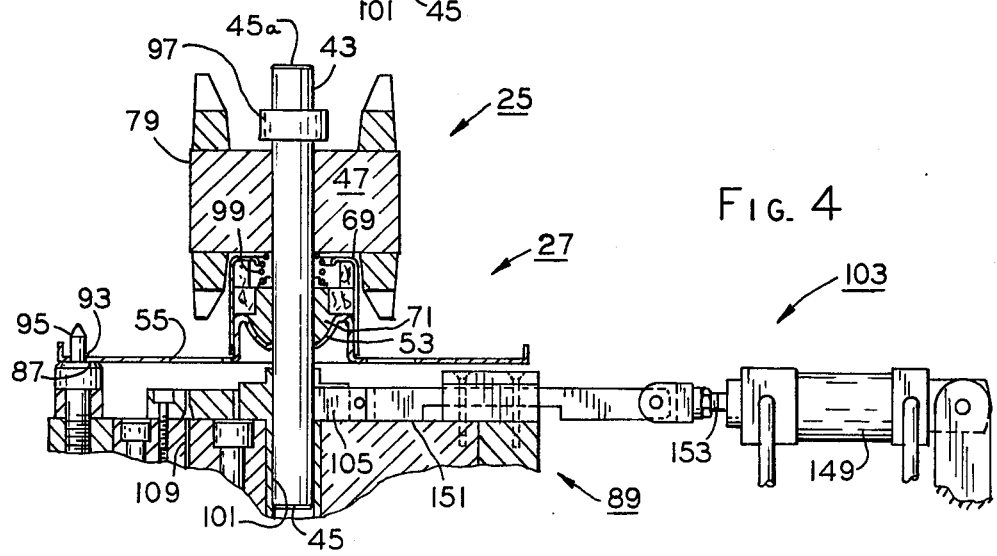

A locking mechanism 103 associated with lower assembly fixture 89 may be actuated by suitable means, as discussed in greater detail hereinafter, so as to displace a plunger 105 thereof into holding or locking engagement with a part of shaft end portion 45 within locating recess 101. In this manner with plunger 105 of locking mechanism 103 in the holding engagement thereof with shaft end portion 45, rotatable assembly 25 is retained in its assembly position against displacement movement in response to the compressive force of thrust spring 99 acting thereon, as best seen in FIG. 4. In other words the locking engagement of plunger 105 with shaft end portion 45 in locating recess 101 acts to cage thrust spring 99 in its compressed state between rotor 47 and thrust collar 97 biased against thrust surface 75 of bearing 71, and the caging of the thrust spring by locking mechanism 103 retains the shaft end portion against displacement from the locating recess thereby to maintain rotatable assembly 25 in its assembly position.

With rotatable assembly 25 so maintained in its preselected position by locking mechanism 103, as discussed above, a set of shims 107 may be passed or extended through a set of shim openings or passage means 109 provided therefor through lower assembly fixture 89 and also through ventilation openings 55 in end frame 27 which are aligned with the shim openings, and the shims are thereby positioned or disposed generally about peripheral surface 79 of rotor 47, as best seen in FIG. 5.

With shims 107 so disposed about peripheral surface 79 of rotor 47, as discussed above, bore 35 of stator 33 may be arranged or otherwise aligned about the rotor peripheral surface with the shims extending in shimming engagement therebetween so as to predeterminately define or establish the aforementioned desired generally uniform air gap between the stator bore and the rotor peripheral surface, as best seen in FIG. 6. While it is preferred that bore 35 of stator 33 be axially perpendicular to the opposite end faces of the stator, such bores in some stators may be skewed slightly with respect to the stator end faces. However, even if bore 35 of stator 33 is skewed, the disposition of shims 107 in shimming engagement between the stator bore and peripheral surface 79 of rotor 47 serves at least in part to assure the establishment of the generally uniform air gap therebetween.

Generally as stator bore 35 is disposed about rotor 47 and shims 107, as discussed above, tabs 41 on opposite end portions 39 of beams 37 are passed or inserted at least in part through apertures 29 in end frame 27 while the end frame is disposed in its preselected position on seat 87 of lower assembly fixture 89. It may be noted that sidewalls 59, 59a of apertures 29, 29a are predeterminately sized so as to be predeterminately larger than tabs 41, 41a received therein, respectively, as best seen in FIGS. 7 and 8. Thus, when tabs 41 are received in aperture 29 of end frame 27, the tabs are predeterminately arranged in spaced apart relation from sidewalls 59 of the apertures, respectively. It may be further noted that even if bore 35 of stator 33 is somewhat skewed when it is disposed about rotor 47 with shims 107 in shimming engagement therebetween, as previously discussed, the predetermined sizing of tabs 41, 41a and apertures 29, 29a to establish the spaced apart relation therebetween is effective to accommodate such stator bore skew.

In this vein due to improper manufacturing and/or handling techniques and thermal shrinkage and/or expansion of the material from which the end frames are formed, the end frames may be warped or otherwise bent from the desired formed configuration thereof. In the event of the occurrence of the aforementioned warpage in end frames 27, 27a, it may be further noted that the predetermined sizing of tabs 41, 41a and apertures 29, 29a to establish the spaced apart relation therebetween is also effective to accommodate such warpage in the end frames. Therefore, in one aspect of the invention, the predetermined spaced apart relation of tabs 41 from sidewalls 59 of apertures 29 when the tabs are received therein, as discussed above, not only accommodates undesirable skew in bore 35 of stator 33 but also undesirable warpage in end frame 29 during the assembly of dynamoelectric machine 21.

A pair of sets of opposite facing abutment surfaces 111, 111a are provided on opposite end portions 39, 39a of beams 37, and tabs 41, 41a extend generally axially from the abutment surfaces, respectively, as best seen in FIGS. 1 and 8. Thus, when tabs 41 on beams 37 are passed into apertures 29 of end frame 27 with the spaced apart relation being established therebetween, as previously discussed, an abutment surface 111 on at least one of beams 37 is seated aainst a confronting seating surface 67 therefor on end frame 27 at least generally adjacent the aperture in which the tab on the at least one beam is received. Of course, if bore 35 of stator 33 was not undesirably skewed and if end frame 27 was not undesirably warped, then abutment surface 111 of each beam would be seated against each confronting seating surface 67 therefor on end frame 27 at least generally adjacent aperture 29 therein. In the event one of the opposite side edges of tabs 41 might be abutted against a confronting part of sidewalls 59 of apertures 29 when the tabs are passed into the apertures, stator 33 and beams 37 may be concurrently adjusted or rotated generally about peripheral surface 79 of rotor 47 so as to space apart the opposite side edges of the tabs from the confronting parts of the aperture sidewalls in end frame 27, as best seen in FIG. 7.

After the disposition of tabs 41 and abutment surfaces 111 of beams 37 with respect to apertures 29 and seating surfaces 67 of end frame 27, as discussed above, bore 73a in bearing 71a of lubrication and bearing system 69a on end frame 27a is fitted or otherwise engaged about end portion 45a of shaft 43, as best seen in FIG. 9. With bearing bore 73a so received about shaft end portion 45, end frame 27a is moved downwardly so as to pass apertures 29a therein over tabs 41a on opposite end portions 39, 39a of beams 37 with sidewalls 59a of apertures 29a being predeterminately arranged in spaced apart relation from tabs 41a in the same manner as discussed hereinbefore with respect to tabs 41 and apertures 21 in end frame 27. This downward movement of end frame 27a is terminated when abutment surfaces 111a on at least two of beams 37 become seated against confronting seating surfaces 67a on end frame 27a at least generally adjacent apertures 29a in which tabs 41 are received thereby to define a preselected or assembly position of the end frame. Thus, when tabs 41a are received in aperture 29a of end frame 27a, as discussed above, the tabs are predeterminately arranged in spaced apart relation from sidewalls 59a of the apertures, respectively. Again, it may be noted that even if bore 35 of stator 33 is undesirably skewed when disposed about rotor 47 with shim 107 in shimming engagement therebetween and even if end frame 27a is undesirably warped, the predetermined sizing of tabs 41a and apertures 29a to predeterminately establish the spaced apart relation therebetween is effective to accommodate not only undesirable skew of stator bore 35 but also undesirable warpage in end frame 27a. Of course, if bore 35 of stator 33 is not undesirably skewed and if end frame 27a is not undesirably warped, then abutment surfaces 111a of each beam 37 would be seated against each confronting seating surface 67a therefor on end frame 27a at least generally adjacent apertures 29a therein. In the event one of the side edges of tabs 41a might be abutted against a confronting part of sidewalls 59a of apertures 29a when the tabs are received therein, end frame 27a may be adjusted or rotated generally about the engagement of bore 73a of bearing 71a with shaft end portion 45a so as to space apart the opposite side edges of the tabs from the confronting parts of the aperture sidewalls in end frame 27a, respectively.

With end frame 27a arranged in its assembly position, as discussed above, an upper assembly fixture 113 of apparatus 91 may be protractively actuated downwardly toward the end frame in order to bias into engagement therewith a set of resilient means, such as for instance coil springs 115 or the like, carried by the upper assembly fixture. When resilient means or springs 115 are engaged with end frame 27a, the compressive forces of the springs urge the end frame into its assembled position with the spaced apart relation between apertures 29a in the end plate and tabs 41a on beams 37 being maintained, respectively. At this time, locking mechanism 103 may be deactivated so as to interrupt the holding engagement between plunger 105 of the locking mechanism and opposite end portion 45 of shaft 43 received in locating recess 101 of lower assembly fixture 89 which, as previously mentioned, was effective to maintain rotatable assembly 25 in the assembly position thereof against the compressive force of the caged thrust spring 99. Therefore, when the holding force of locking plunger 105 is released from shaft end portion 45, the compressive force of thrust spring 99 is effective to move rotatable assembly upwardly relative to end frames 27, 27a and stator 33 in the assembly positions thereof. Upon this upward movement of rotatable assembly 25 in response to the compressive force of thrust spring 99, rotor 47 is slidably repositioned within stator bore 35 on shims 107 interposed therebetween, and such upward movement is terminated when thrust collar 97a on end portion 45a of shaft 43 becomes biased in engagement with thrust taking surface 75a of bearing 71a in lubrication and bearing system 69a on end frame 27a. In this manner, end play is provided in dynamoelectric machine 21 with thrust spring 99 urging thrust collars 97, 97a into engagement with thrust taking surfaces 75, 75a of bearings 71, 71a, respectively, as discussed above; however, it may be noted that the compressive forces of springs 115 on upper assembly fixture 113 are predeterminately greater than that of thrust spring 99 thereby to insure that end frame 27a is not displaced from its assembly position on beams 37 when the compressive force of the thrust spring is exerted against the end frame through the seating engagement of bearing 71a on bearing seating surface 53a of the end frame.

Figure 11:
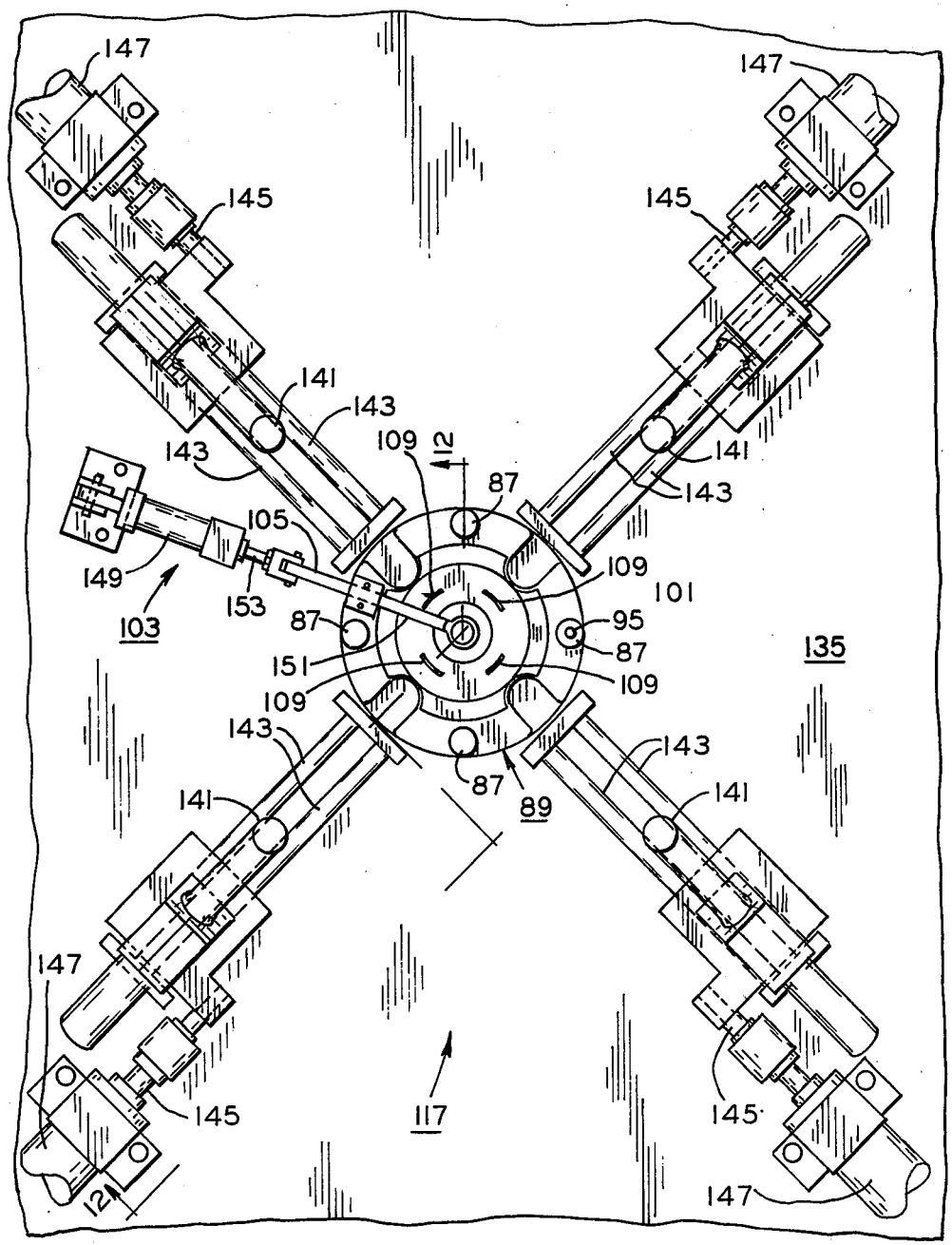
FIG. 11 is a plan view of a lower assembly fixture of the apparatus of FIG. 10, partial sectional views of the lower assembly fixture being shown in FIGS. 3 and 4.

As illustrated in FIG. 9 and as best seen in FIGS. 11, 13, and 14, a pair of sets of welding means 117, 117a are provided for generally simultaneously welding end frames 27, 27a at least generally adjacent sidewalls 59, 59a of apertures 29, 29a therein to tabs 41, 41a on opposite end portions 39, 39a of beams 37 extending through the apertures, respectively, as best seen in FIGS. 7 and 8. A pair of sets of welds 119, 119a thus created by the welding means span across at least a part of the space predeterminately established between tabs 41, 41a and aperture sidewalls 59, 59a thereby to inteconnect the end frames against displacement from the opposite ends of the beams when the end frames and stator 33 are in the assembly positions thereof, respectively. Welding means 117 are protractively and retractively movable on lower assembly fixture 89 with respect to preselected welding positions therefore, respectively, and welding means 117a are carried by upper assembly fixture 113 so as to be conjointly movable therewith to the preselected welding positions, as discussed in greater detail hereinafter.

Subsequent to the welding of end frames 27, 27a and beams 37, shims 107 are retracted through ventilation openings 55 in end frame 27 and shim passages 109 in location seat 87 of lower assembly fixture 89 so as to be removed from shimming engagement between stator bore 35 and rotor peripheral surface 79. Thus, upon the retraction of shims 107, it may be noted that the aforementioned generally uniform air gap established by shims 107 between stator bore 35 and rotor peripheral surface 79 is maintained by the welded interconnection of end frames 27, 27a with beams 37 of stator 33 since not only undesirable skew of the stator bore but also undesirable warpage of the end frames is accommodated by this method of assembling dynamoelectric machine 21, as previously discussed. To complete the description of this method of assembling dynamoelectric machine 21, upper assembly fixture 113 is retracted upwardly disengaging its springs 115 from end frame 27a, and the dynamoelectric machine may be removed from apparatus 91 displacing end frame 27 and shaft end portion 45 from location seat 87 and locating recess 101 of lower assembly fixture 89.

With reference again to the drawings in general and recapitulating at least in part with respect to the foregoing, apparatus 91 is provided for securing beams 37 on stationary assembly 23 for dynamoelectric machine 21 to end frames 21, 21a thereof with the beams having tabs 41, 41a on opposite ends 39, 39a thereof and with the end frames having apertures 29, 29a extending therethrough predeterminately sized larger than the tabs, respectively (FIGS. 1–14). Means, such as location seat 87 of lower assembly fixture 89 or the like for instance, is provided for locating end frame 27 with opposite end portion 39 of at least one of beams 37 seated thereon and with tabs 41 in apertures 29 of end frame 27 arranged predeterminately in spaced apart relation therefrom, respectively (FIGS. 2, 7, 8, 11, and 13). Resilient means, such as springs 115 of upper assembly fixture 113 or the like for instance, is provided for biasing end frame 27a against opposite end portions 39a of at least two of beams 37 with tabs 41a on opposite end portions 39a of the beams being received in apertures 29a of end frame 27a and arranged predeterminately in spaced apart relation therefrom, respectively (FIGS. 7-9 and 13). Welding means 117, 117a are provided for generally simultaneously welding tabs 41, 41a to a part of end frames 27, 27a at least generally adjacent apertures 29, 29a when the tabs and the apertures are in the spaced apart relation thereof, respectively (FIGS. 7-9 and 11-13).

Figure 10:
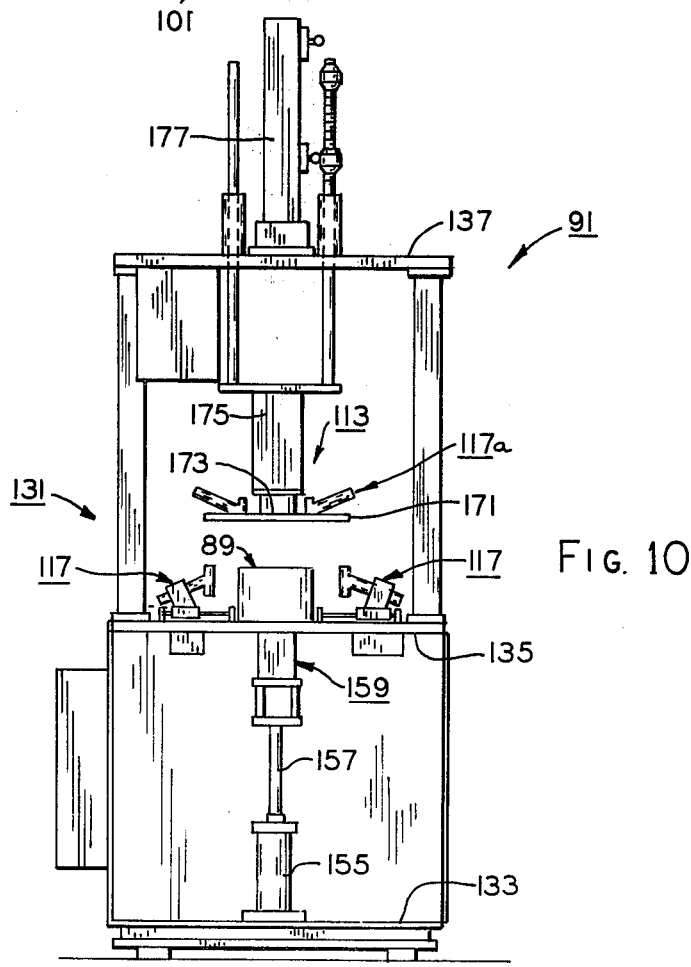
FIG. 10 is a schematic front elevational view of an apparatus for assembling the dynamoelectric machine of FIG. 1.

More particularly and with specific reference to FIGS. 10-13, apparatus 91 comprises a work station having a frame or housing 131 including a base plate or lower cross member 133, an intermediate plate or cross member 135, and a top plate or cross member 137 which are respectively secured to the frame by suitable means, as best seen in FIG. 10.

Figure 12:
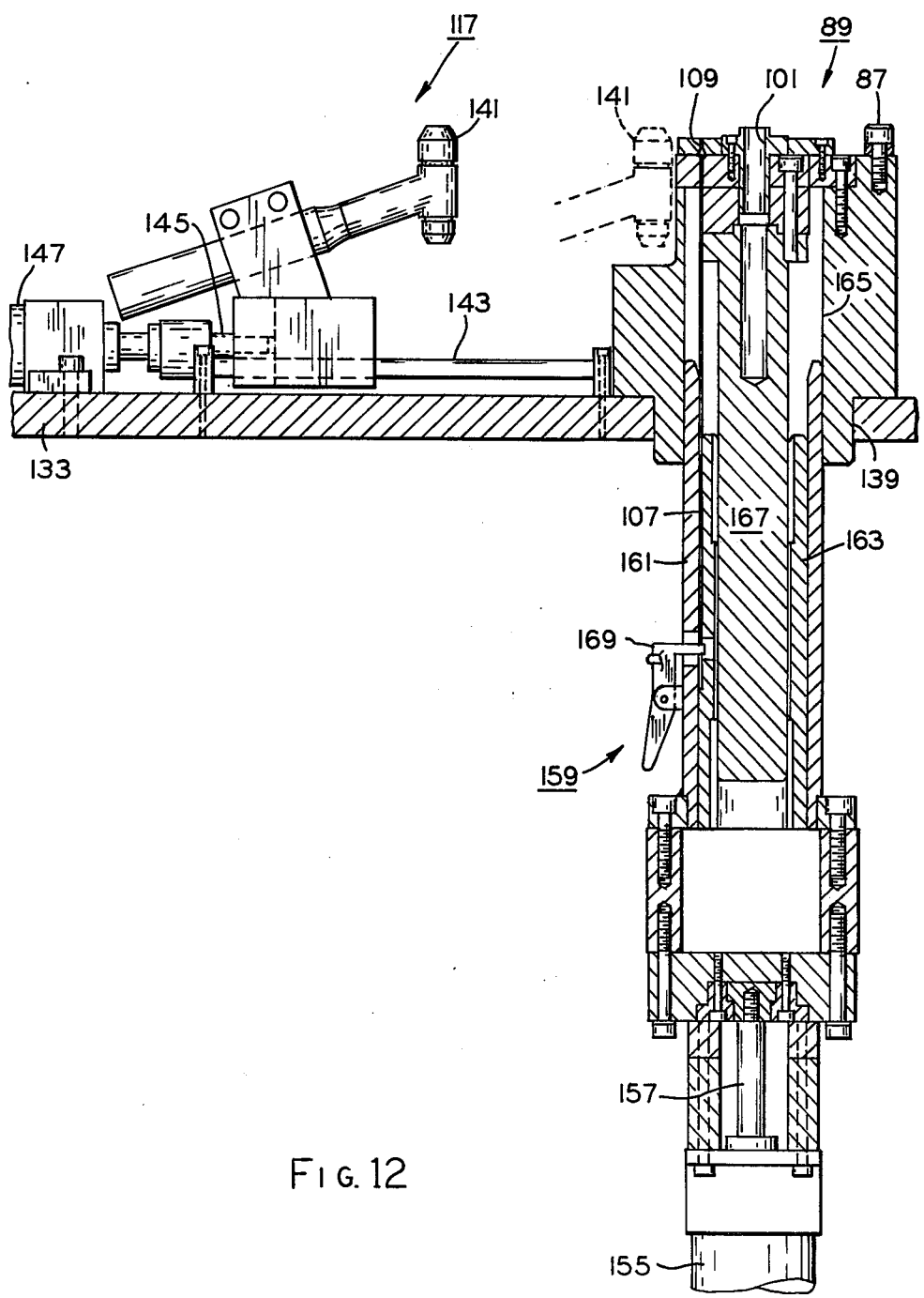
FIG. 12 is a partial sectional view taken along line 12—12 in FIG. 11.

Lower assembly fixture 89 is generally centrally located on intermediate plate 135 of apparatus 91 by suitable means (not shown), and the fixture extends through an opening 139 provided therefor in the intermediate plate, as best seen in FIGS. 11 and 12. The aforementioned welding means 117 include a set of four plasma needle arc welding torches 141 which are respectively slidably arranged on guide rods or rails 143 secured to intermediate plate 135 generally about lower assembly fixture 89, and the torches are respectively drivenly connected for conjoint reciprocal movement with a respective drive or piston rod 145 of a set of actuating means, such as for instance a servo motor 147 or the like which may be of the double acting air or hydraulic motor type. Thus, upon actuation of servo motors or actuating means 147, torches 141 are protractively movable from a retracted or at rest position on guide rails 143 toward the preselected welding or protractive positions thereof, as shown in dotted outline in FIG. 12, adjacent lower assembly fixture 89 to generally conjointly create welds 119 interconnecting end frame 27 with tabs 41 of beams 39, as previously discussed and as illustrated in FIGS. 7-9. Torches 141 are available from the Linde Division of the Union Carbide Corp., Chicago, Ill. under model number 997450. Although welding means 117 and torches 141 are illustrated herein for purposes of disclosure, it is contemplated that other welding means of various other types may be utilized within the scope of the invention so as to meet at least some of the objects thereof.

Locking mechanism 103 also includes actuating means, such as for instance a servo motor 149 or the like which may be of the double acting air or hydraulic type, and actuating means or servo motor 149 is mounted by suitable means to intermediate plate 135 of apparatus 91 generally adjacent lower assembly fixture 89 thereon, as best seen in FIGS. 4 and 11. Plunger 105 of locking mechanism 103 is reciprocably slidably movable in a passage means, such as for instance a groove or slot 151 or the like, provided therefor in lower assembly fixture 89 and which intersects or opens into locating sleeve 101 thereof, as best seen in FIGS. 4 and 11. Locking plunger 105 is drivenly connected for conjoint reciprocal movement with a drive or piston rod 153 of servo motor 149. Thus, upon actuation of servo motor 149, plunger 105 of locking mechanism 103 is protractively and retractively movable between an at rest position, as best seen in FIG. 11, and a protracted or actuated position, as best seen in FIG. 4. Of course, in its protracted position, locking plunger 105 is engaged in holding relation with shaft end portion 45 of rotatable assembly 25 received within location sleeve 101 of lower fixture assembly, as previously discussed and as best seen in FIG. 4.

As best seen in FIGS. 10-12, another actuating means, such as for instance a servo motor 155 or the like which may be of the double acting air or hydraulic type, is mounted by suitable means to base plate 133 of apparatus 91 and includes a reciprocably movable drive or piston rod 157 which is drivingly connected with means, such as a shim support or guide mechanism 159 for instance, for supporting shims 107. Shim guide mechanism 159 includes a pair of generally concentrically arranged cylinders or sleeves 161, 163 for carrying shims 107 and which are interconnected by suitable means with piston rod 157 of servo motor 155 so as to be conjointly reciprocably movable therewith, respectively. Outer shim carrying sleeve 161 is slidably and guidably received in a bore 165 generally axially or vertically provided therefor through the lower end portion of lower assembly fixture 89, and inner shim carrying sleeve 163 is slidably and guidably received about a guide rod 167 carried by the lower assembly fixture and extending generally concentrically through the lower assembly fixture bore downwardly therefrom toward base plate 133 of apparatus 91. The lower end portions of shims 107 are received between shim carrying sleeves 161, 163, and the upper end portions of the shims are slidably received in shim passage 109 provided therefor in lower assembly fixture 89. Quick disconnect means, such as for instance a set of latches 169 or the like, are respectively pivotally mounted on outer shim carrying sleeve 161 for positioning engagement with shims 107 so as to facilitate quick release thereof whenever it is necessary to change the shims. Thus, upon actuation of servo motor 155, shim actuating mechanism 159 and shims 107 are conjointly protractively movable upwardly from an at rest or retracted position, as best seen in FIG. 12, toward a protracted or actuated position so as to affect the upward movement of shims 107 through shim passages 109 in lower assembly fixture 89 thereby to position the shims about peripheral surface 79 of rotor 47, as previously discussed and best seen in FIGS. 5 and 12.

Upper assembly fixture 113 includes a carrier plate 171 having a generally central portion 173 secured by suitable means to the lower end of a reciprocably movable drive or piston rod 175 of another actuating means, such as for instance a servo motor 177 or the like which may be of a double acting air or hydraulic type, and actuating means or servo motor 177 is, in turn, secured by suitable means to top cross plate 137 of frame 131 in apparatus 91, as best seen in FIGS. 10, 13, and 14. A set of arms 179 are integrally provided on carrier plate 171 emanating generally radially from central portion 173 of the carrier plate, and the aforementioned welding means 117a are fixedly mounted by suitable means to the upper side of the carrier plate arms, respectively. Welding means 117a includes another set of four plasma needle arc welding torches 181 which are generally similar to welding torches 141 discussed above, and the nozzles of torches 181 extend through a set of openings 183 provided in preselected locations therefor through central portion 173 of carrier plate 171, respectively. Springs 115 are carried on a set of retainers 185 therefor secured to carrier plate 171 generally adjacent central portion 173 and extending from the lower side thereof, respectively. Thus, upon actuation of actuating means or servo motor 177, upper assembly fixture 113 is protractively movable from a retracted or at rest position thereof, as seen in FIGS. 10 and 13, downwardly toward lower assembly fixture 89 on cross plate 135 of apparatus 91 into a protracted or actuated position, as best seen in FIG. 9. Upon this protractive movement of upper assembly fixture 113 into the actuated position thereof, springs 115 on the lower side of the upper assembly fixture are biased into engagement with end frame 27a and welding torches are predeterminately positioned to create welds 119a interconnecting end frame 27a with tabs 41a of beams 39, as previously discussed and as illustrated in FIGS. 7-9.

From the foregoing, it is now apparent that a novel and a novel method for assembling dynamoelectric machine 21 have been presented meeting the objects set out hereinbefore, as well as others, and that changes as to the precise arrangements, shapes, details and connections of the components utilized in such methods and also in the steps and the precise order thereof in such methods may be made by those having ordinary skill in the art without departing from the spirit of the invention or from the scope thereof as set out in the claims which follow.

What we claim as new and desire to secure by Letters Patent of the United States is:

1. A method of assembling a dynamoelectric machine having a stationary assembly including first and second opposite end frames having first and second bearings associated therewith and with first and second thrust surfaces on the first and second bearings, respectively, at least the first end frame having a generally central opening therethrough generally in coaxial alignment with the first bearing, first and second sets of apertures extending generally axially through the first and second end frames, a stator having a generally axial bore therethrough, a set of beams secured to the stator with the beams having first and second opposite ends with first and second tabs extending generally axially from the first and second opposite ends of the beams, respectively, and the dynamoelectric machine also having a rotatable assembly including a shaft having first and second opposite end portions, a rotor secured to the shaft between the first and second shaft end portions, a first thrust collar, a thrust spring, and a second thrust collar secured to the second shaft end portion, the method comprising the steps of:

locating the first end frame generally in a preselected position;

arranging the first thrust collar and the thrust spring on the first shaft end portion with the thrust spring engaged between the first thrust collar and a part of the rotor at least adjacent the first shaft end portion;

inserting the first shaft end portion through the first bearing and the opening in the first end frame;

engaging the first thrust collar on the first shaft end portion with the first thrust surface on the first bearing;

moving the first shaft end portion further through the first bearing and the opening in the first end frame toward a preselected position with respect thereto;

compressing the spring means between the rotor part and the first thrust collar in its engagement with first thrust surface on the first bearing as the first shaft end portion is moved toward its preselected position;

locking the first shaft end portion in its preselected position;

positioning a set of shims generally about the rotor;

arranging the stator bore generally about the rotor and the shim set with the shim set in shimming engagement therebetween;

passing the first tabs on the first opposite ends of the beams at least in part into the first apertures in the first end shield generally upon the arranging of the stator bore about the rotor and shim set;

seating the first opposite end of at least one of the beams against the first end frame upon the passing of the first tabs on the beams at least in part into the first apertures in the first end frame;

adjusting concurrently the stator and beams with respect to the first end frame so as to arrange the first tabs on the beams in spaced apart relation from the first apertures in the first end frame, respectively;

receiving the second shaft extension in the second bearing associated with the second end frame;

passing the second apertures in the second end frame generally about the second tabs on the second opposite ends of the beams, respectively;

seating the second opposite end of at least two of the beams against the second end frame upon the passing of the second apertures thereof about the second tabs on the beams;

adjusting the second end frame with respect to the beams so as to arrange the second apertures in the second end frame in spaced apart relation from the second tabs on the beams, respectively;

loading resiliently the second end frame in a direction toward the second opposite ends of the beams;

unlocking the first shaft end portion;

moving the first and second shaft end portions in the first and second bearings and also the rotor in the stator bore in response to the compressive force of the thrust spring upon the unlocking of the first shaft end portion;

engaging the second thrust collar with the second thrust surface of the second bearing associated with the second end frame upon the occurrence of the second moving step;

welding generally simultaneously the first and second end frames at least generally adjacent each of the first and second apertures therein to at least a part of each of the tabs extending at least in part into the first and second apertures; and removing the shim set from the shimming engagement thereof between the rotor and the stator bore.

2. A method of assembling a dynamoelectric machine having a stationary assembly and a rotatable assembly, the stationary assembly including a pair of opposite end frames with a pair of sets of apertures extending therethrough, respectively, at least one of the end frames having a generally central opening spaced from the apertures therein, a stator, a set of beams secured to the stator, and the beams having a pair of opposite ends with a pair of oppositely extending tabs thereon, respectively, and the rotatable assembly including a shaft having a pair of opposite end portions, and a rotor secured to the shaft between the shaft end portions, the method comprising the steps of:

locating the at least one end frame generally in a preselected position;

arranging the rotatable assembly in a preselected position with respect to the at least one end frame with one of the shaft end portions extending through the central opening of the at least one end frame;

locking the rotatable assembly in its preselected position;

aligning the stator about the rotor to define an air gap therebetween;

disposing the tabs on one of the opposite end portions of the beams at least in part within one of the aperture sets in the at least one end frame, respectively;

abutting the one opposite end portion of at least one of the beams with the at least one end frame;

disposing the other of the aperture sets in the other of the end frames generally about the tabs on the other of the opposite ends of the beams, respectively;

abutting the other opposite ends of at least two of the beams with the other end frame;

exerting a force on the other end frame urging it toward the abutment with the other ends of the at least two beams; and welding generally simultaneously the end frames at least generally adjacent the aperture sets therein to at least a part of each tab on the opposite ends of the beams disposed in the aperture sets, respectively.

3. The method as set forth in claim 2 wherein the aperture sets are respectively defined by sidewalls in the end frames with the sidewalls being sized predeterminately larger than the tabs on the opposite ends of the beams and wherein the first disposing step includes positioning the tabs on the one opposite ends of the beams predeterminately in spaced apart relation from the sidewalls of the one aperture set in the at least one end frame.

4. The method as set forth in claim 3 wherein the second disposing step includes positioning the tabs on the other opposite ends of the beams predeterminately in spaced apart relation from the sidewalls of the other aperture set in the other end frame.

5. The method as set forth in claim 2 wherein the aligning step includes engaging a set of shims between the rotor and the stator so as to define the air gap therebetween.

6. The method as set forth in claim 2 comprising the intermediate step of unlocking the rotatable assembly and moving it with respect to the stationary assembly toward another preselected position therein prior to the welding step.

7. A method of assembling a dynamoelectric machine having a stationary assembly and a rotatable assembly, the stationary assembly including a pair of opposite end frames with a pair of sets of apertures extending therethrough, respectively, at least one of the end frames having a generally central opening therethrough, a stator having a bore therethrough, a set of beams secured to the stator, a pair of opposite ends on the beams with a pair of oppositely extending tabs on the opposite ends of the beams, respectively, and the rotatable assembly including a shaft having a pair of opposite end portions, and a rotor secured to the shaft between the shaft end portions, the method comprising the steps of:

locating the at least one end frame and the rotatable assembly generally in preselected positions with one of the shaft end portions of the rotatable assembly extending through the generally central opening in the at least one end frame;

aligning the stator bore at least in part about the rotor of the rotatable assembly to define an air gap therebetween;

receiving the tabs on one of the opposite ends of the beams within the apertures of one of the sets thereof in the at least one end frame and engaging the one opposite end of at least one of the beams with the at least one end frame when the tabs on the one opposite ends of the beams are received within the apertures of the one set thereof in the at least one end frame, respectively;

disposing the apertures of the other of the sets thereof in the other of the end frames generally about the tabs on the other of the opposite ends of the beams; and welding the end frames at least generally adjacent the aperture sets therein to at least a part of each tab on the beams arranged within the aperture sets, respectively.

8. The method as set forth in claim 7 comprising the intermediate step of engaging the other opposite ends of at least two of the beams with the other end frame when the tabs on the other opposite ends of the beams are disposed within the other aperture set in the other end frame.

9. The method as set forth in claim 7 comprising the intermediate set of locking the rotatable assembly in its preselected position.

10. The method as set forth in claim 9 comprising the further intermediate step of unlocking the rotatable assembly and moving it resiliently toward another preselected position with respect to the stator bore and end frames prior to the welding step.

11. The method as set forth in claim 7 comprising the intermediate step of urging the other end frame in a direction to insure the abutment thereof with the other opposite ends of the at least two beams.

12. The method as set forth in claim 7 wherein the apertures of the one set thereof are sized predeterminately larger than the tabs on the one opposite ends of the beams, respectively, and wherein the receiving and engaging step includes positioning the tabs on the one opposite ends of the beams in spaced apart relation with respect to the apertures of the one set thereof, respectively.

13. The method as set forth in claim 5 wherein the apertures of the other set thereof are sized predeterminately larger than the tabs on the other opposite ends of the beams and wherein the disposing step includes positioning the tabs on the other opposite ends of the beams generally in spaced apart relation with respect to the apertures of the other set thereof, respectively.

14. The method as set forth in claim 7 wherein the aligning step includes arranging a set of shims generally about the rotor of the rotatable assembly and placing the stator bore about the rotor and the shim set with the shim set being engaged between the rotor and the stator bore so as to define the air gap therebetween.

15. A method of securing a set of beams carried in a stationary assembly for a dynamoelectric machine to a pair of opposite end frames thereof, the beams including a pair of opposite end portions having a pair of opposite seats thereon with a pair of opposite tabs extending from said seats, respectively, and the end frames including a pair of opposite faces, and a pair of sets of apertures having sidewalls intersecting with the opposite faces, respectively, the sidewalls of the apertures being sized predeterminately larger than the tabs, the method comprising the steps of:
　locating the tabs on one of the opposite ends of the beams at least in part within the apertures in one of the end frames, respectively;
　abutting one of the opposite seats of at least one of the beams against one of the opposite faces of the one end frame;
　rotating the beams conjointly with respect to the one end frame and insuring the spacing apart of the tabs on the one opposite end of the beam from the sidewalls of the apertures in the one end frame;
　placing the apertures in the other of the end frames generally about the tabs on the other of the ends of the beams, respectively;
　abutting the other of the opposite seats of at least two of the beams against one of the opposite faces of the other end frame;
　rotating the other end frame on at least the other opposite seats of the at least two beams and insuring the spacing apart of the sidewalls of the apertures in the other end frame from the tabs on the other opposite ends of the beams; and
　welding generally simultaneously the end frames at least adjacent the intersection of the sidewalls of the apertures therein with the other of the opposite faces of the end shields to at least a part of each tab within respective ones of the apertures in the spaced apart relation with the sidewall thereof, respectively.

16. A method of securing a set of beams mounted on a stator for a dynamoelectric machine to a pair of opposite end frames thereof so as to insure the alignment of a bore in the stator about a preselected axis therefor in the event the stator bore is skewed, the beams having a pair of opposite ends with a pair of opposite tabs extending therefrom, respectively, and the end frames having a pair of sets of apertures extending therethrough with sidewalls of the apertures being sized predeterminately larger than the tabs on the opposite ends of the beams, respectively, the method comprising the steps of:
　locating the tabs on one of the opposite ends of the beams at least in part within the apertures in one of the end frames and engaging one of the opposite ends on at least one of the beams with the one end frame;
　canting conjointly the beams and the tabs thereof located within the apertures in the one end frame to compensate for any skewing of the stator bore and effect its alignment about the preselected axis therefor;
　adjusting the beams conjointly to insure the spacing apart of the tabs on the one opposite ends of the beams from the sidewalls of the apertures in the one end frame, respectively, while maintaining the alignment of the stator bore about the preselected axis therefor;
　placing the apertures in the other of the end frames generally about the tabs on the other of the opposite ends of the beams and adjusting the other end frame to insure the spacing apart of the sidewalls of the apertures in the other end frame from the tabs on the other opposite ends of the beams; and
　welding the end frames at least generally adjacent the apertures therein to at least apart of each tab on the opposite ends of the beams arranged within respective one of the apertures in the end frame, respectively.

17. A method of assembling a dynamoelectric machine so as to compensate for skew in the event of the occurrence thereof in a bore of a stator for the dynamoelectric machine and/or so as to compensate for warpage in the event of the occurrence thereof in a pair of end frames for the dynamoelectric machine, the stator also having a set of beams secured thereto with a pair of sets of oppositely extending tabs on opposite ends of the beams, respectively, and the end frames having a pair of sets of apertures extending therethrough with the apertures having sidewalls being predeterminately sized larger than the tabs, respectively, the method comprising the steps of:
　locating one of the end frames in an assembly position;
　placing one of the tab sets on one of the opposite ends of the beams within one of the aperture sets in the one end frame predeterminately in spaced apart relation with the sidewalls of the one aperture set obviating interfering engagement therebetween and positioning the axis of the stator bore generally in alignment with a preselected assembly axis with respect to the assembly position of the one end frame thereby to compensate for stator bore skew and warpage in the one end frame in the event of the occurrence thereof when the one end frame is in its assembly position and the stator bore axis is aligned with the preselected assembly axis therefor;
　engaging the one opposite end on at least one of the beams with the one end frame in the assembly portion thereof at least upon the placement of the one tab set within the one aperture set;
　associating the other of the end frames in a assembly position with respect to the stator when the axis thereof is aligned with the preselected assembly axis therefor and placing the sidewalls of the other of the aperture sets in the other end frame predeterminately in spaced apart relation about the other of the tab sets on the beams obviating interfering engagement therebetween so as to compensate for stator bore skew and warpage in the other end frame in the event of the occurrence thereof when the other end frame is in its assembly position and the stator bore axis is aligned with the preseleceed assembly axis therefor; and
　establishing generally simultaneously a pair of sets of welds interconnecting the tab sets with the end frames at least generally adjacent the sidewalls of the apreture sets so as to maintain the assembly position of the end frames with respect to the stator with the axis of the stator bore generally coincidental with the preselected assembly axis, respectively.

18. A method of assembling a dynamoelectric machine having a stationary assembly and a rotatable assembly, the stationary assembly including a pair of opposite end frames with a pair of sets of apertures extending therethrough, respectively, at least one of the end frames having a generally central opening therethrough, a stator having a bore therethrough, a set of beams secured to the stator, a pair of opposite ends on the beams with a pair of oppositely extending tabs on the opposite ends of the beams, respectively, and the rotatable assembly including a shaft having a pair of opposite end portions, and a rotor secured to the shaft between the shaft end portions, the method comprising the steps of:
　locating the at least one end frame and the rotatable assembly generally in preselected positions with one of the shaft end portions of the rotatable assembly extending through the generally central opening in the at least one end frame;

aligning the stator bore at least in part about the rotor of the rotatable assembly to define an air gap therebetween receiving the tabs on one of the opposite ends of the beams within the apertures of one of the sets thereof in the at least one end frame, respectively;

disposing the apertures of the other of the sets thereof in the other of the end frames generally about the tabs on the other of the opposite ends of the beams and engaging the other opposite ends of at least two of the beams with the other end frame when the tabs on the other opposite ends of the beams are displaced within the apertures of the other set thereof in the other end frame, respectively; and welding the end frames at least generally adjacent the aperture sets therein to at least a part of each tab on the beams arranged within the aperture sets, respectively.

19. The method as set forth in claim 18 comprising the intermediate step of retaining the rotatable assembly in its preselected position.

20. The method as set forth in claim 9 comprising the further intermediate step of moving the rotatable assembly toward another preselected position with respect to the stator bore and end frames prior to the welding step 21. The method as set forth in claim 18 comprising the intermediate step urging the other end frame in a direction to insure the abutment thereof with the other opposite ends of the at least two beams.

22. The method as set forth in claim 18 wherein the apertures of the other set thereof are sized predeterminately larger than the tabs on the other opposite ends of the beams and wherein the disposing and engaging step includes positioning the apertures of the other set thereof in spaced apart relation from the tabs on the other opposite ends of the beams, respectively.

23. The method as set forth in claim 18 wherein the apertures of the one set thereof are sized predeterminately larger than the tabs on the one opposite ends of the beams and wherein the receiving step includes positioning the tabs on the one opposite ends of the beams in spaced apart relation from the apertures of the one set thereof, respectively 24. A method of assembling a dynamoelectric machine having a stationary assembly and a rotatable assembly, the stationary assembly including a pair of opposite end frames with a pair of sets of apertures extending therethrough, respectively, at least one of the end frames having a generally central opening therethrough, a stator having a bore therethrough, a set of beams secured to the stator, a pair of opposite ends on the beams with a pair of oppositely extending tabs on the opposite ends of the beams, respectively, and the rotatable assembly including a shaft having a pair of opposite end portions, and a rotor secured to the shaft between the shaft end portions, the method comprising the steps of:

locating the at least one end frame and the rotatable assembly generally in preselected positions with one of the shaft end portions of the rotatable assembly extending through the generally central opening in the at least one end frame;

locking the rotatable assembly in its preselected position;

aligning the stator bore at least in part about the rotor of the rotatable assembly to define an air gap therebetween.

receiving the tabs on one of the opposite ends of the beams within the apertures of one of the sets thereof in the at least one end frame, respectively;

disposing the apertures of the other of the sets thereof in the other of the end frames generally about the tabs on the other of the end portions of the beams;

unlocking the rotatble assembly and moving it resiliently toward another preselected position with respect to the stator bore and end frames; and welding the end frames at least generally adjacent the aperture sets therein to at least a part of each tab on the beams arranged within the aperture sets, respectively.

25. The method as set forth in claim 24 wherein the apertures of the other set thereof are sized predeterminately larger than the tabs on the other opposite ends of the beams and wherein the disposing step includes positioning the apertures of the other set thereof in spaced apart relation from the tabs on the other opposite ends of the beams, respectively.

26. The method as set forth in claim 24 wherein the apertures of the one set thereof are sized predeterminately larger than the tabs on the one opposite ends of the beams and wherein the receiving step includes positioning the apertures of the one set thereof in spaced apart relation with the tabs on the one opposite ends of the beams, respectively.

27. The method as set forth in claim 24 wherein the aligning step includes arranging a set of shims between the stator bore and the rotor.

28. The method as set forth in claim 24 comprising the intermediate step of urging the other end frame in a direction to insure the abutment thereof with the other opposite ends of at least two of the beams.

29. A method of assembling a dynamoelectric machine having a stationary assembly and a rotatable assembly, the stationary assembly including a pair of opposite end frames with a pair of sets of apertures extending therethrough, respectively, at least one of the end frames having a generally central opening therethrough, a stator having a bore therethrough, a set of beams secured to the stator, a pair of opposite ends on the beams with a pair of oppositely extending tabs on the opposite ends of the beams, respectively, and the rotatable assembly including a shaft having a pair of opposite end portions, and a rotor secured to the shaft between the shaft end portions, the method comprising the steps of:

locating the at least one end frame and the rotatable assembly generally in preselected positions with one of the shaft end portions of the rotatable assembly extending through the generally central opening in the at least one end frame;

aligning the stator bore at least in part about the rotor of the rotatable assembly to define an air gap therebetween;

receiving the tabs on one of the opposite ends of the beams within one of the aperture sets in the at least one end frame, respectively;

disposing the other of the aperture sets in the other of the end frames generally about the tabs on the other of the end portions of the beams and urging the other end frame in a direction to insure the abutment thereof with the other opposite ends of at least two of the beams, respectively; and welding the end frames at least generally adjacent the aperture sets therein to at least a part of each tab on the beams arranged within the aperture sets, respectively.

30. The method as set forth in claim 29 wherein the apertures of the other set thereof are sized predeterminately larger than the tabs on the other opposite ends of the beams and wherein the disposing step includes positioning the apertures of the other set thereof in spaced apart relation from the tabs on the other opposite ends of the beams, respectively.

31. The method as set forth in claim 29 wherein the apertures of the one set thereof are sized predeterminately larger than the tabs on the one opposite ends of the beams and wherein the receiving step includes positioning the apertures of the one set thereof in spaced apart relation with the tabs on the one opposite ends of the beams, respectively.

32. The method as set forth in claim 29 wherein the aligning step includes arranging a set of shims between the stator bore and the rotor.

33. A method of securing a set of beams mounted on a stator for a dynamoelectric machine to a pair of opposite end frames thereof so as to insure the alignment of a bore in the stator about a preselected axis therefor in the event the stator bore is skewed, the beams having a pair of opposite ends with a pair of opposite tabs extending therefrom, respectively, and the end frames having a pair of sets of apertures extending therethrough with sidewalls of the apertures being sized predeterminately larger than the tabs on the opposite ends of the beams, respectively, the method comprising the steps of:

locating the tabs on one of the opposite ends of the beams at least in part within the apertures in one of the end frames and canting conjointly the beams and the tabs thereof located within the apertures in the one end frame to compensate for any skewing of the stator bore and effect its alignment about the preselected axis therefor;

adjusting the beams conjointly to insure the spacing apart of the tabs on the one opposite ends of the beams from the sidewalls of the apertures in the one end frame, respectively, while maintaining the alignment of the stator bore about the preselected axis therefor;

placing the apertures in the other of the end frames generally about the tabs on the other of the opposite ends of the beams and engaging the other end frame with the other opposite ends of at least two of the beams;

adjusting the other end frame to insure the spacing apart of the sidewalls of the apertures in the other end frame from the tabs on the other opposite ends of the beams; and welding the end frames at least generally adjacent the apertures therein to at least a part of each tab on the opposite ends of the beams arranged within respective one of the apertures in the end frame, respectively.

34. The method as set forth in claim 33 wherein the placing and engaging step includes urging the other end frame into the engagement thereof with the opposite ends of the at least two beams.

35. A method of assembling a dynamoelectric machine so as to compensate for skew in the event of the occurrence thereof in a bore of a stator for the dynamoelectric machine and/or so as to compensate for warpage in the event of the occurrence thereof in a pair of end frames for the dynamoelectric machine, the stator also having a set of beams secured thereto with a pair of sets of oppositely extending tabs on opposite ends of the beams, respectively, and the end frames having a pair of sets of apertures extending therethrough with the apertures having sidewalls sized predeterminately larger than the tabs, respectively, the method comprising the steps of:

locating one of the end frames in a preselected assembly position;

placing one of the tab sets on one of the opposite ends of the beams within one of the aperture sets in the one end frame predeterminately in spaced apart relation with the sidewalls of the one aperture set obviating interfering engagement therebetween and positioning the axis of the stator bore generally in alignment with a preselected assembly axis with respect to the assembly position of the one end frame thereby to compensate for stator bore skew and/or warpage in the one end frame in the event of the occurrence thereof when the one end frame is in its assembly position and the stator bore axis is aligned with the preselected assembly axis therefor;

engaging the other of the end frames with the other of the opposite ends of at least two of the beams thereby to associate the other end frame in an assembly position with respect to the stator when the axis thereof is aligned with the preselected assembly axis therefor and placing the sidewalls of the other of the aperture sets in the other end frame predeterminately in spaced apart relation about the other of the tab sets on the other opposite ends of the beams obviating interfering engagement therebetween so as to compensate for stator bore skew and/or warpage in the other end frame in the event of the occurrence thereof when the other end frame is in its assembly position and the stator bore axis is aligned with the preselected assembly axis therefor; and establishing generally simultaneously a pair of sets of welds interconnecting the tab sets with the end frames at least generally adjacent the sidewalls of the aperture sets so as to maintain the assembly position of the end frames with respect to the stator with the axis of the stator bore generally coincidental with the preselected assembly axis, respectively.

36. The method as set forth in claim 35 wherein the placing and positioning step includes engaging one opposite end of at least one of the beams with the one end frame in the assembly position thereof.

37. A method of securing a set of beams of a stationary assembly for a dynamoelectric machine to at least one end frame therefor, the beams having at least one end with a tab extending therefrom, respectively, and the at least one end frame having a set of apertures extending therethrough with the apertures being sized predeterminately greater than the tabs, respectively, the method comprising the steps of:

locating the tabs on the at least one end of the beams at least in part within the apertures in the at least one end frame and arranging the tabs and the apertures in spaced apart relation from each other, respectively;

engaging the at least one end of at least one of the beams with the at least one end frame; and securing the tabs and the at least one end frame at least adjacent the apertures therein against displacement, respectively.

38. The method as set forth in claim 37 wherein the stationary assembly has another end frame with another set of apertures extending therethrough, the beams have another end with another tab extending therefrom opposite the at least one ends of the beams with the another tabs being sized predeterminately smaller than the apertures of the another set thereof, and comprising the intermediate step of disposing the apertures of the another set thereof about the another tabs on the another ends of the beams and arranging the apertures of the another set thereof and the another tabs on the another end of the beams in spaced apart relation from each other, respectively.

39. The method as set forth in claim 38 comprising the further intermediate step of abutting the another end frame with the another end of at least two of the beams, respectively.

40. The method as set forth in claim 39 comprising the additional step of attaching the another tabs and the another end frame at least adjacent the apertures of the another set thereof in the another end frame against displacement, respectively.

* * * * *